June 27, 1939.     E. E. BECKMAN     2,163,657
WELDING MACHINE
Filed Aug. 7, 1937     2 Sheets-Sheet 1
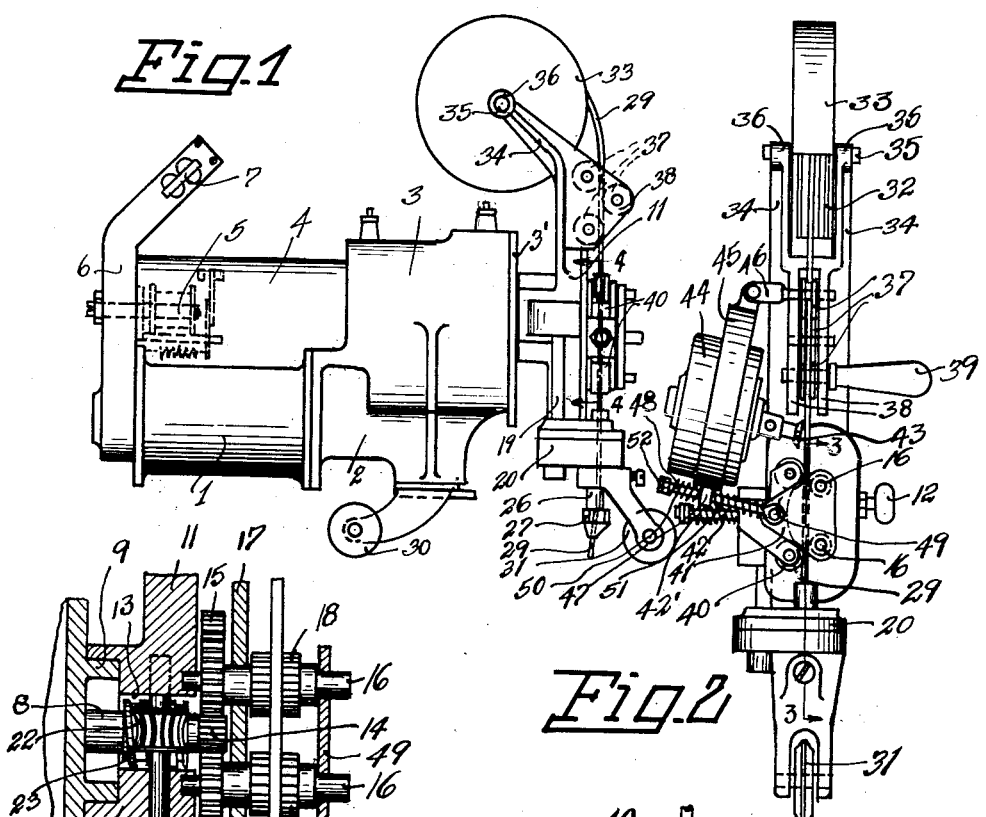
Inventor
Ernest E. Beckman
By
Glenn L. Fish
Attorney June 27, 1939.  E. E. BECKMAN  2,163,657
WELDING MACHINE
Filed Aug. 7, 1937  2 Sheets-Sheet 2
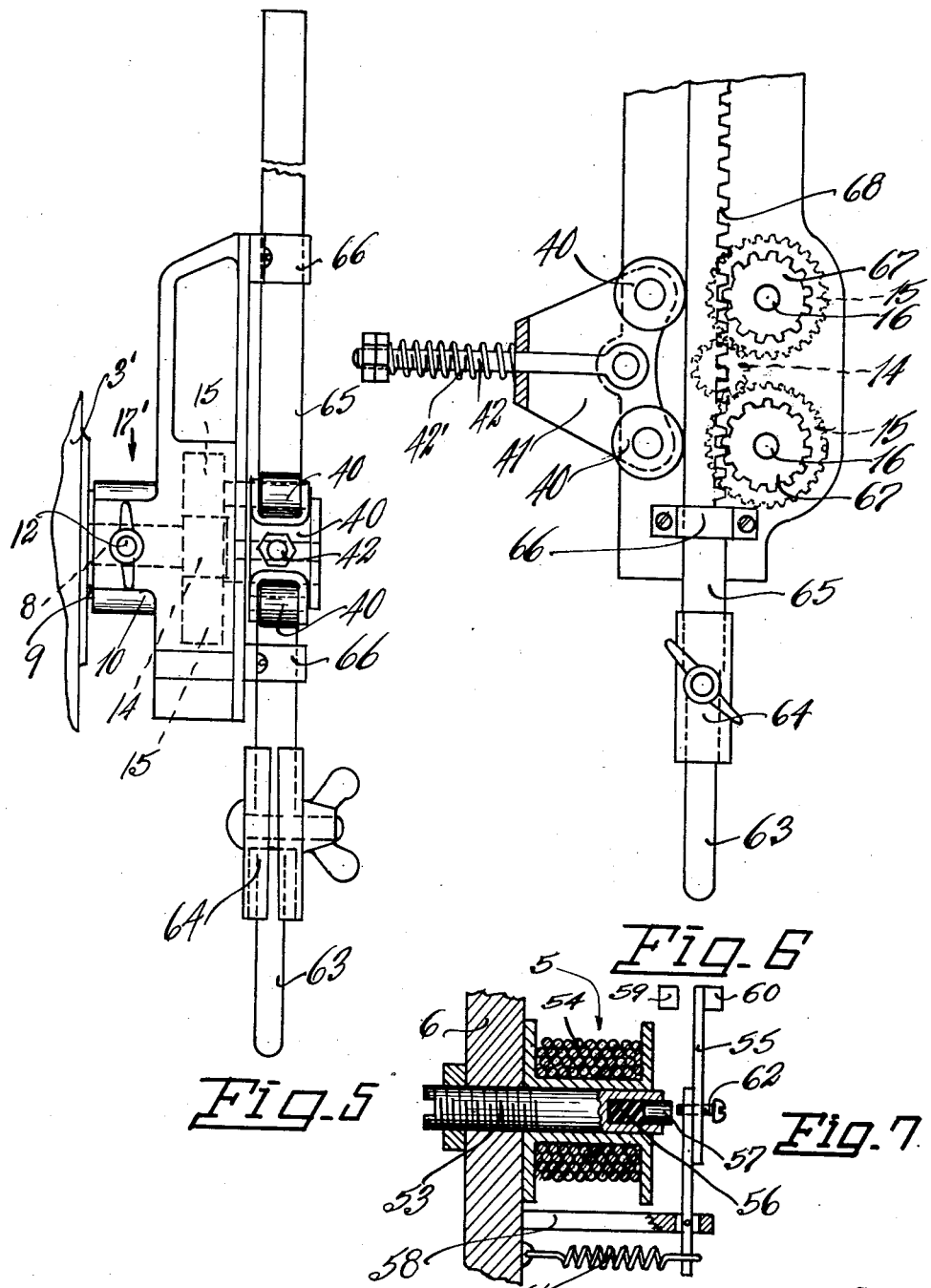
Inventor
Ernest E. Beckman
By Glenn L. Fish
Attorney Patented June 27, 1939

2,163,657

UNITED STATES PATENT OFFICE 2,163,657

WELDING MACHINE

Ernest E. Beckman, Lind, Wash., assignor of one-half to Walter D. Krehbiel, Lind, Wash.

Application August 7, 1937, Serial No. 157,914

5 Claims. (Cl. 219—8)

This invention relates to an improved electric welding machine of the type disclosed in my prior Patent No. 2,073,603, issued March 16, 1937. One object of the invention is to provide a machine of this character having improved means for feeding a welding rod towards work being done and maintaining the end of the rod in the correct spaced relation to the work to provide the proper gap during a welding operation.

Another object of the invention is to provide means for causing the welding rod to follow a circular path or orbit as it is advanced towards the work and thus permit what is known as weaving or lacing to be automatically carried out without special attention by the operator of the welding machine.

Another object of the invention is to not only permit the welding rod to be automatically advanced towards the work and moved in a circular path, but cause these movements to have a definite relation to each other and originate from a common drive shaft.

Another object of the invention is to provide a machine of this character wherein the welding rod passes between an improved arrangement of feeding rollers and pressure rollers which urge the welding rod towards the feed rollers and thus insure steady movement of the rod during a welding operation.

Another object of the invention is to provide the welding machine with improved traction means consisting of rollers so arranged that they rest against an article being welded and thus allow the machine to be very easily shifted along the article and a welding operation quickly performed.

Another object of the invention is to provide an improved relay for controlling a clutch and effecting movement of the welding rod towards and away from the work as occasion requires to maintain the end of the rod the proper distance from the work.

Another object of the invention is to provide improved flux removing means whereby a portion of the welding rod can be bared and a good electrical contact established between the welding rod and pressure rollers which maintain the rod in engagement with the feed rollers.

The invention is illustrated in the accompanying drawings, wherein

Figure 1 is a side elevation of the improved welding machine with certain elements omitted for the sake of clearness.

Figure 2 is a front elevation thereof.

Figure 3 is a sectional view taken vertically through the head of the machine along the line 3—3 of Figure 2.

Figure 4 is an enlarged fragmentary view taken along the line 4—4 of Figure 1 illustrating the construction of the feeding means for the welding rod.

Figure 5 is a side elevation of a modified form of rod carrying and feeding mechanism.

Figure 6 is a front elevation of the feeding mechanism shown in Figure 5.

Figure 7 is a fragmentary sectional view taken vertically through the relay.

This improved electric welding machine is intended for use as a portable outfit which can be easily carried from one place to another and operated by a single workman when in use. The motor 1 is a conventional electrical motor and is mounted back of the lower portion 2 of a casing 3 in which a transmission and magnetic reversing clutch are mounted, the transmission and clutch being of the construction shown in the issued Patent No. 2,073,603 previously referred to. A shell 4 extends rearwardly from the clutch casing 3 and houses a relay 5 indicated by dotted lines in Figure 1 and illustrated in detail in Figure 7. A vertically disposed handle 6 is provided at the rear of the motor 1 and the shell 4 and carries a switch 7 for controlling operation of the motor and the magnetic clutch.

The shaft 8 projects forwardly through the closure plate 3' at the front end of the clutch casing 3 and the clutch in this casing controls directional rotation of the shaft. A collar 9 projects forwardly from the plate 3' about the shaft concentric thereto and about this collar fits a sleeve 10 carried by and projecting rearwardly from the head 11, a set screw 12 being carried by the sleeve for engaging the collar and firmly but detachably holding the head in place. This permits removal of the head when repairs or cleaning are necessary and also permits the machine to be stored in a small space when not in use. The shaft extends forwardly through a pocket 13 formed in the head and at its front end carries a small gear or pinion 14 meshing with large gears 15 carried by the driven shafts 16. The front plate 17 of the head is formed with openings through which the shafts 16 extend and beyond this wall or plate the shafts carry toothed feed rollers 18. It will thus be seen that the feed rollers will receive rotary motion from the shaft 8 but at a reduced rate of speed. A bored shank 19 extends downwardly from the head to a gear housing 20 and through this shank extends a rotatably mounted transmission shaft 21 carrying at its upper end a worm gear 22 disposed within the pocket 13 and meshing with a worm 23 upon the drive shaft 8, as shown in Figure 3. At its lower end the shaft 21 carries a gear 24 meshing with the gear 25 of the tubular guide 26 extending vertically through the gear housing. This guide extends below the gear housing and at its lower end carries a cap 27 which is threaded upon the tube and tapers towards its lower end where it is formed with an opening 28 offset radially of the axis of the tube. By so forming the cap, the welding rod 29 will be moved in a circular path or orbit during rotation of the guide 26 through which the welding rod is moved towards the work during a welding operation. Rollers 30 and 31 which are in the form of castors are provided under the transmission housing 2 and the gear housing 20 in position to rest upon the work and permit easy movement of the welding machine along the work in operative relation to a crack or seam to be welded.

The welding rod 29 is wound upon a drum 32 housed in a casing 33 which fits between the forks or arms 34 rising from the head 11 with the shaft or axle 35 of the drum rotatably mounted in bearings 36 at the upper ends of the arms. Movement of the welding rod downwardly from the drum is guided by rollers 37 rotatably mounted between plates 38, and attention is called to the fact that the shaft for one of these rollers carries a handle 39. Therefore, the operator of the welding machine may grasp the two handles 6 and 39 and guide movement of the machine during a welding operation. The welding rod should be pressed against the feed rollers 18 so that a good feeding operation can take place, and in order to do so, there have been provided pressure rollers 40 rotatably carried by a floating bracket or carriage 41 which is urged towards the welding rod by a spring 42' disposed about the pin 42 which slidably mounts the bracket. Referring to Figure 4 it will be seen that the rollers 40 hold the welding rod in close contacting engagement with the feed rollers and, since the feed rollers are corrugated, rotation of the feed rollers will cause the welding rod to be fed downwardly towards the work at a steady rate of speed. As previously set forth, a weaving motion is automatically imparted to the welding rod during its downward movement due to the eccentric location of the opening 28 of the head 27 and the metal will be properly distributed to accomplish a good welding operation.

In order to cause the flux to be removed from a side portion of the welding rod as it is moved downwardly and a good electrical contact established which will cause current to pass through the welding rod, there has been provided a cutter 43 carried by the shaft of an electric motor 44. This motor is mounted in a clamping ring 45 pivotally suspended from a bracket 46 formed at the outer end of the shaft for the upper roller 37. At its bottom the clamping ring carries an eye 47 slidably mounted upon a rod or stem 48 pivoted to a plate 49 which fits upon the extremities of the shafts 16. Springs 50 and 51 are mounted upon the rod 48 at opposite sides of the eye 47, and, by adjusting the nut 52 at the end of the rod, the tension of these springs can be adjusted and the cutter 43 caused to be held against the welding rod at sufficient pressure to properly remove flux and without unduly scraping the rod.

During operation of the welding machine, the welding rod is automatically advanced towards the work or retracted therefrom so that it will be maintained in the correct spaced relation to the work and an arc of the proper length provided. This is accomplished by means of an electro-magnetic clutch mounted in the clutch housing or casing 3 and constructed in accordance with the disclosure in the prior Patent, No. 2,073,603, previously referred to. The clutch is wired in circuit with the relay, as shown in the diagram of the patent referred to. The relay is 10 of the specific construction illustrated in Figure 7 and referring to this figure it will be seen that the core 53 of the electro-magnet 54 has its end which faces the armature 55 formed with a pocket in which is mounted a stiff spring consisting of a rubber block 56 protected by a non-magnetic insert 57 which projects forwardly from the core. The armature 55 is pivoted to a post 58 with one end extending between the contacts 59 and 60 and at its other end engaged by a spring 61 serving to yieldably hold the armature in engagement with the contact 60. A screw 62 of non-magnetic material is threaded through the armature and so disposed that when the armature is attracted towards the core of the magnet, the screw will make contact with the non-magnetic insert 57. It will thus be seen that when the magnet is energized and the armature drawn towards it, direct contact cannot be had between the armature and the core of the magnet.

By providing the spring 61, a definite tension is exerted on the armature of the relay, retracting it from the end of the core of the electro-magnet. This spring is so adjusted that the contact 60 controlling the retracting of the welding rod is closed at the desired low arc voltage value. It is a well known fact that in the clapper type of electro-magnet such as used on relays, the tractive force of the core on the armature is not constant at some particular point of the armature travel. The force of attraction increases suddenly and very rapid when the armature is very close or approaches the attractive face of the core. Advantage of this phenomena is taken in this relay for controlling the electric arc welding machine as follows: As explained before, the armature resistance to the movement until this change takes place is controlled by a light spring attached to the armature in the proper manner to secure the desired action, and this spring being adjustable for air gap between the armature and the core furnishes a means by which the under voltage contacts of the relay are closed at the desired voltage. For example, an adjustment is made so that the armature is retracted from the face of the core at 18 volts and the low voltage relay contact is established and functions in the desired manner in closing the desired circuits to cause retraction of the welding electrode. A very small increase in arc voltage over the set 18 volts causes the armature to be attracted to the face of the core and as it reaches a position very close to the core face the attraction increases suddenly and the armature would touch the face of the core and produce what is known as the sealing effect of an electro-magnet. This effect is undesirable as after the two magnetic materials are brought in contact a very small voltage will hold the armature in contact with the over-voltage relay contacts. However, since the core of the relay is so made as to contain the rubber insert which has very small elastic limits in compression, the armature is prevented from sealing to the core. Also the adjustable screw placed in the movable armature can and is so adjusted as to touch and actuate the elastic medium when the armature of the relay is at the proper distance from the core for the sudden increase in tractive effort to become evident. At this point there is no contact established with either of the controlling circuits and the contacts that control the forward movement of the electrode are separated by a very short distance and any slight increase in voltage will increase the tractive force or effort of the core and by compressing this elastic material allows the desired over-voltage contacts of the relay to close. In other words the fluttering of the armature 55 is controlled and gives the welding rod a constant feed towards and away from the work to be welded.

In Figures 5 and 6 a modified form of head has been illustrated. In this embodiment of the invention a carbon stick 63 is employed for melting metal along a crack or seam which is to be welded instead of using the welding rod 29. This carbon stick is secured in a clamp 64 provided at the lower end of a rack bar which extends longitudinally of the head and is slidably mounted and guided in its sliding movement by guide clips 66. The head, which is designated as a whole by the numeral 17', is of substantially the same construction as the head 17 except that the upper portion carries one of the clips 66 instead of being formed with forks for mounting a drum and carrying rollers for guiding the welding rod. Certain other parts are of the same construction used in the preferred form and designated by corresponding numerals. It should be noted, however, that the shafts 16 carry pinions 67 instead of the feed rollers 18 and that these pinions mesh with the rack teeth 68 provided along one side of the rack bar 65, the rack bar being held in engagement with the pinions by the rollers 40 of the floating bracket 41. Directional rotation of the shafts 18 to maintain the end of the carbon the proper distance from the work is controlled, as previously set forth.

Having thus described the invention, what is claimed as new is:

1. In an electrical welding apparatus, a body including a motor casing and a transmission casing in advance of the motor casing, a head at the front of the transmission casing, means carried by said head for carrying a welding rod, a tubular guide for the welding rod rotatably mounted, means for rotating said guide, means for advancing the welding rod downwardly through the guide tube, and a tip for the lower end of the guide tube having a rod receiving passage eccentric to the axis of the tube to cause the lower end of the welding rod to be moved in a circular path about its axis during rotation of the guide as it is advanced towards the work.

2. In an electrical welding apparatus, a body including a motor casing and a transmission casing in advance of the motor casing, a head at the front of the transmission casing, means carried by said head for carrying a welding rod, a tubular guide for the welding rod rotatably mounted in a vertical position at the front of said head and having a removable tip at its lower end eccentric to the vertical axis of the guide for causing the lower end of the welding rod to move in a circular path about the axis of the tube during rotation of the tube, means for feeding the welding rod downwardly and simultaneously imparting rotary motion to the guide in timed relation to its downward movement, and rollers carried by the transmission body and the lower portion of the head to facilitate movement of the welding apparatus along an article to be welded and maintain the tip spaced upwardly from the work.

3. In an electrical welding apparatus, a body including a motor casing and a transmission casing in advance of the motor casing, a head at the front of the transmission casing, means carried by said head for carrying a welding rod, a tubular guide for the welding rod rotatably mounted in a vertical position at the front of said head and having a removable tip at its lower end formed with a rod passage eccentric to the vertical axis of the guide to cause the lower end of the welding rod to move in a circular path about the axis of the tube as the rod is shifted downwardly, feeding rollers rotatably mounted at the front of said head for engaging the welding rod at one side thereof and imparting longitudinal movement to the rod, a rotary main shaft, gears for imparting rotation to the rollers, and a shaft and gearing for transmitting rotary motion from said main shaft to said guide.

4. In an electrical welding apparatus, a body including a motor casing and a transmission casing in advance of the motor casing, a head at the front of the transmission casing, means carried by said head for carrying a welding rod, a tubular guide for the welding rod rotatably mounted in a vertical position at the front of said head and having a tip at its lower end eccentric to the vertical axis of the guide and adapted to move the lower end of the welding rod in a circular path as it is shifted downwardly, feeding rollers at the front of the head spaced one above another in position to engage one side of the welding rod and having shafts journaled in the head, a transmission shaft projecting from the transmission casing into the head, gears for transmitting rotary motion from the transmission shaft to the roller shafts at a reduced speed, a counter shaft disposed vertically and having geared connections with the transmission shaft and the guide for transmitting rotary motion to the guide, a floating bracket shiftably mounted at the front of the head and having rollers for engaging the other side of the rod from the feed rollers, and means for urging the bracket towards the welding rod to maintain its roller in contact with the rod and hold the rod against the feed rollers.

5. In an electrical welding apparatus, a body including a motor casing and a transmission casing in advance of the motor casing, a head at the front of the transmission casing, means carried by said head for supporting a spool of welding rod, means carried by the head for feeding the welding rod downwardly towards work to be welded, rollers above the feeding means for directing the welding rod towards the feeding means, pins for rotatably mounting said rollers, a hanger suspended from one pin at a side of the head, a motor carried by said hanger, and a cutter carried by the shaft of said motor in position to make contact with a side of the welding rod and remove flux therefrom as the rod is shifted downwardly.

ERNEST E. BECKMAN.